Feb. 14, 1956 M. C. KIDD 2,734,954

CARD SWITCHING DEVICE

Filed Sept. 30, 1952 2 Sheets-Sheet 1

INVENTOR.
Marshall C. Kidd
BY Olin J. Mitchell
ATTORNEY

Feb. 14, 1956 M. C. KIDD 2,734,954

CARD SWITCHING DEVICE

Filed Sept. 30, 1952 2 Sheets-Sheet 2

INVENTOR.
Marshall C. Kidd

BY Oliver F. Mitchell
ATTORNEY

United States Patent Office 2,734,954
Patented Feb. 14, 1956

2,734,954

CARD SWITCHING DEVICE

Marshall C. Kidd, Haddon Heights, N. J., assignor to Radio Corporation of America, a corporation of Delaware Application September 30, 1952, Serial No. 312,380
9 Claims. (Cl. 200—46)

The present invention relates to improvements in card record devices of the general type employed in statistical machine control.

In more particularity, the present invention relates to improvements in the fabrication and structure of card type electro-mechanical storage devices such that the card storage device embraces an element of secrecy whereby the information carried, stored or contained by the card record is available only by specialized processing in specific forms of equipment.

The prior art contains many examples of card storage devices such as are used in specialized machines for counting, tabulating, sorting or otherwise specially treating the data contents of various record sheets and documents by electro-mechanical means. It has been taught that such cards may embrace a plurality of precisely spaced holes, areas of electrical conductivity or higher magnetic permeability optical tracks of predetermined patterns, notched edges, etc., for recording sales records, examination papers, ballots, census reports, etc. Once information is placed upon these cards by the various techniques suggested they may be inserted or fed into specialized machines which will analyze and read off the desired information or answer.

Any of the prior art card record fabricating techniques have, however, resulted in a card record which bears plainly visible evidence of the nature of the recorded material stored thereon, once the general system or method of recording the information becomes known. In most instances, such card records have been satisfactory since the type of information recorded by such cards was not normally of much interest or value to persons other than those permitted direct access to the card. Or, if general access to the card was obtainable, information represented by the indicia borne by the card was generally of insufficient value to warrant an outsider acquainting himself with the complexities of the recording system in order to interpret the information.

In the field of electrical communication, where a degree of communication security is often desirable, numerous systems have been proposed in which statistical garbling of the communication channel is carried on through frequency inversion, extraneous signal impregnation, electrical code group inversion, etc. In order for a receiving location to utilize such a garbled transmission it is necessary that the receiving location be fully apprised of the manner in which desired information has been garbled. One convenient way of providing a receiving location with the necessary degarbling information may be in the form of a card record of the above discussed electro-mechanical storage type. Key control cards may then be assigned to each garbled transmission such that successful communication over a garbled communication channel can be realized only when both transmitter and receiving location garbling and degarbling procedures are controlled by a predetermined type of key card. In such a system it becomes evident that any given garbled transmission has no more security than the security of the key cards assigned to the transmission.

Accordingly, in subscriber type television systems in which degarbling of a centrally broadcast subscriber television signal is to be accomplished through the use of a card record, copies of which are distributed only to paid subscribers, the card record must necessarily be of a type discouraging easy and speedy reproduction by unauthorized individuals The control card must further be of a nature which prevents its construction and stored information from being gleaned by mere superficial examination and ideally should resist any attempt at detecting or determining the information stored by the card by unauthorized persons.

It is, therefore, an object of the present invention to provide an improved form of record bearing card of the type suitable for electro-mechanical control of an apparatus.

It is further an object of the present invention to provide an improved form of electro-mechanical type record bearing card which embraces a high degree of security against unauthorized reproduction or utilization.

It is still a further object of the present invention to provide an improved form of record bearing card suitable for use as a key control card in subscriber television system.

It is yet another object of the present invention to provide a key control card for use by subscribers to a paid television system which will enable the subscriber holding the card to successfully view television broadcasts which otherwise appear garbled to receivers not provided with a key card.

It is another object of the present invention to provide a subscriber type television key control card which is difficult to counterfeit or superficially analyze to the extent of permitting the indicia it bears to be usefully gleaned.

In the realization of the above objects the present invention contemplates the construction of a key control card having a plurality of laminations, one or more of which is provided with a plurality of holes through which electrical contacts are permitted to operate upon conductive circuit paths placed upon one or more lamination surfaces. Sections of ultimately complete circuit paths are incorporated on the hidden surfaces of the laminations and made complete only through the application of predetermined pressures in discrete areas on the outer surfaces of the card.

A better understanding of the present invention, its method of operation and other objects and features of advantage may be forthcoming from a reading of the following specification, especially when taken in connection with the accompanying drawings, in which—

Figures 1, 2, 3:
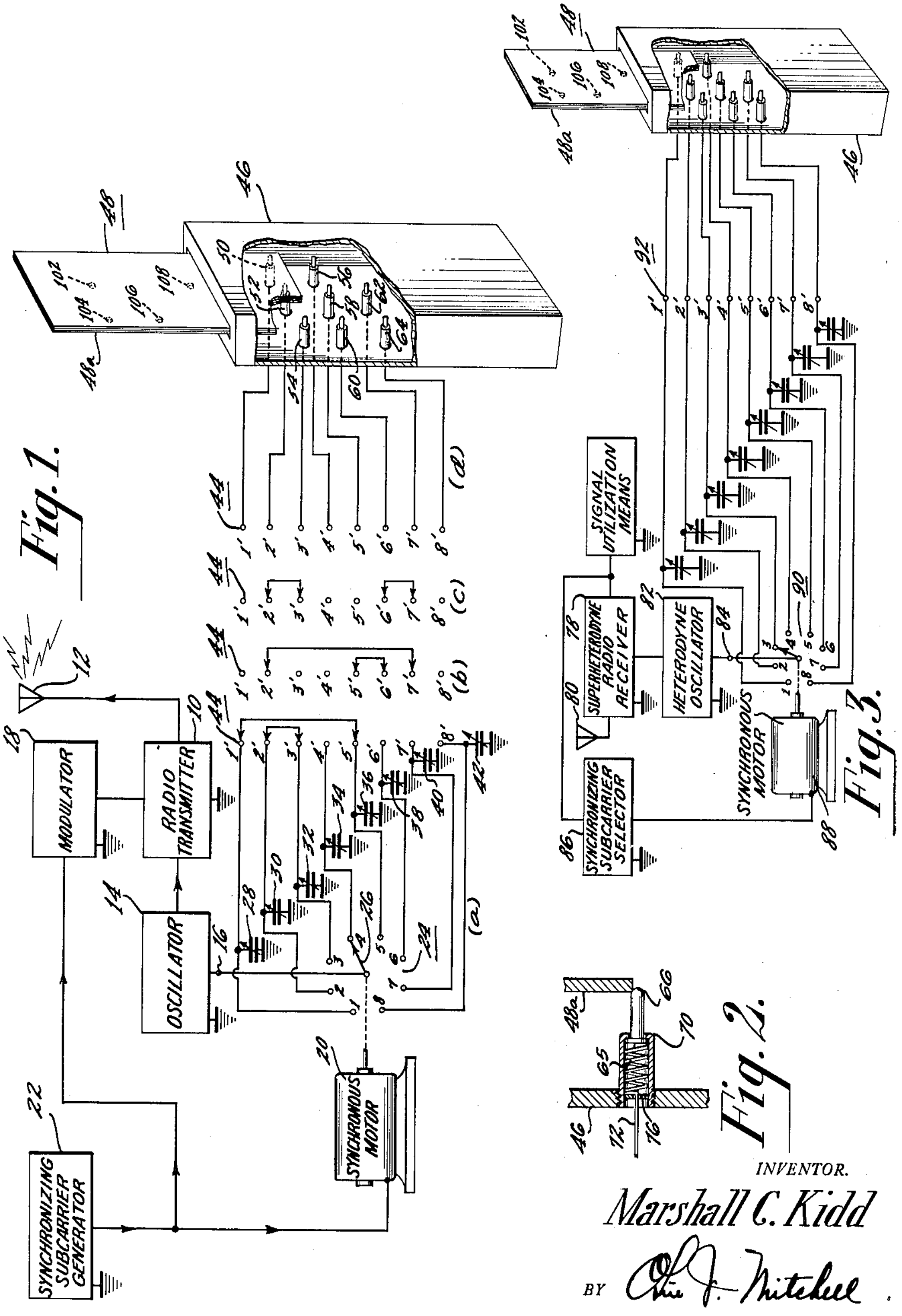
Figure 1 is a combination block and diagrammatic representation of a communication transmission garbling system in which the present invention may find application as a garbling control element.
Figure 2 is a sectional view of a portion of a mechanical arrangement illustrated more fully in Figure 3.
Figure 3 is a combination block and diagrammatic representation of a communication receiving system adapted to successfully receive garbled communication signals under the control of a key card or card storage device constructed in accordance with the present invention.

In order to better understand the novel features of the present invention it is best to consider its application to an instrumentality having one or more characteristics suited to control by information of a type that may be recorded or stored by a key card. Such an arrangement is illustrated in Figure 1 in which a radio transmitter 10 is connected with the radio antenna 12 for transmission of a radio communication signal. The frequency of the radio transmitter 10 is determined by an oscillator 14 whose frequency may be shifted by means of applying various values of capacity to a frequency control terminal 16. The oscillator 14 may take the form of a simple Colpits oscillator with frequency control terminal 16 being connected across the resonant circuit of the Colpits oscillator. A modulator 18 is connected with the transmitter 10 for imposing one or more forms of signal modulation upon the transmitted radio carrier.

In order to provide secrecy in signal transmission, the frequency of the oscillator 14 is caused to change periodically by means of a synchronous motor 20. The motor 20 is driven by the output of a synchronizing sub-carrier generator 22 whose output is also applied to the modulator 18 so that frequency changing synchronizing information may be also transmitted to a receiver location. It is understood that in practice the synchronizing sub-carrier as applied to the modulator 18 will merely supplement other forms of modulation which carry the intelligence to be communicated.

The synchronous motor 20 in Figure 1 is mechanically coupled with a switch arrangement 24 having a moveable armature 26 adapted to contact a plurality of contacts 1 through 8. Each contact has associated with it a capacitor which may be of either the fixed or variable type. Capacitors 28, 30, 32, 34, 36, 38, 40 and 42 are illustrated as respectively connected to contacts 1 through 8. If then a connection terminal bank such as shown at 44 is provided for terminals 1′ through 8′ (corresponding to the terminals 1 through 8 of switch 24) the pattern of frequency change caused by the synchronous modulator 20 may be made to vary by providing different modes of interconnection between the various terminals 1′ through 8′. For example, as shown at the terminal board 44 terminals 1′ and 5′ are connected and terminals 2′ and 3′ are connected. This will cause the capacity presented to terminals 1 and 5 of the switch 24 to represent the sum of capacitors 28 and 36. Correspondingly, the capacity presented at terminals 2 and 3 will be the sum of capacitors 20 and 32. Each of the variable capacitors 28 through 42 may be provided with an index setting which may be changed for definite series of broadcasts.

In Figure 1 at *"b"* there is shown another terminal board connection arrangement 44′. Here terminals 2′ and 7′ are connected and terminals 5′ and 6′ are connected. This provides a different frequency change pattern for a given rotation of the switch 24 since now the capacity available at terminals 2 and 7 will be the sum of capacitors 30 and 40, while the capacity applied at terminals 5 and 6 will be the sum of capacitors 36 and 38.

In Figure 1 at *"c"* there is shown still another connection for the terminal board 44″. The connections at the terminal board 44 may, of course, be made physically, that is by throwing of switches or patching cord techniques. On the other hand, the necessary connections may be accomplished by a card record of the electromechanical type to which the present invention is in main directed. Such an arrangement for determining the connections between the terminals 1′ through 8′ of the terminal board 44″ is shown at *"d."* A card record holder and analyzer 46 is provided for accepting and receiving a laminated record or key card 48. Spring actuated pressure contactors 50, 52, 54, 56, 58, 60, 62 and 64 are applied against the surface of the control card 48 as it is inserted and held by the holder 46. Thus, any conductive paths provided by the control card 58 between areas thereon corresponding to the position of the contactors 50 through 64 are providing a "set-up" for the frequency change pattern produced by the synchronous motor 20.

Figure 2 is a sectional view of one type of spring actuated pressure contactor which may be employed as shown at *"d"* in Figure 1. The pin 66 of the contactor is urged outwardly by the spring 68 contained by the housing 70. Spring 68 is electrically connected to the pin 66 so that the left hand extremity of the spring 68 may be connected to a wire 72 extending through the insulating stop 76. The wire 72 may be applied to one of the terminals 1′ through 8′.

A receiving arrangement which is complementary in nature to the transmission system of Figure 1 is illustrated in Figure 3. Here a superheterodyne radio receiver 78 is provided with received radio signals from the radio antenna 80. The local oscillator for the superheterodyne receiver 78 is shown separated from the block 78 at 82. A frequency change terminal 84 is provided for the oscillator 82 in a manner similar to the frequency control terminal 16 for the oscillator 14 of Figure 1. The synchronizing sub-carrier generated by the generator 22 in Figure 1 is detected by the sub-carrier detector 86 connected with the output of the superheterodyne radio receiver 78. The demodulated sub-carrier is then applied to a synchronous motor 88 which in turn drives a frequency changing switch 90. The action of the switch 90 is the counterpart of the switch 24 in Figure 1 described above. Depending upon the connections between the terminals 1′ through 8′ at terminal bank 92 of the receiver, the tuning of the superheterodyne receiver 78 may be made to agree with the pattern of frequency change produced in the transmitter. The necessary connections between terminals 1′ through 8′ at the terminal board 92 may be established by another multilayer or laminated card 48 having a holder 56 exactly the same as that shown in Figure 1.

Figure 4:
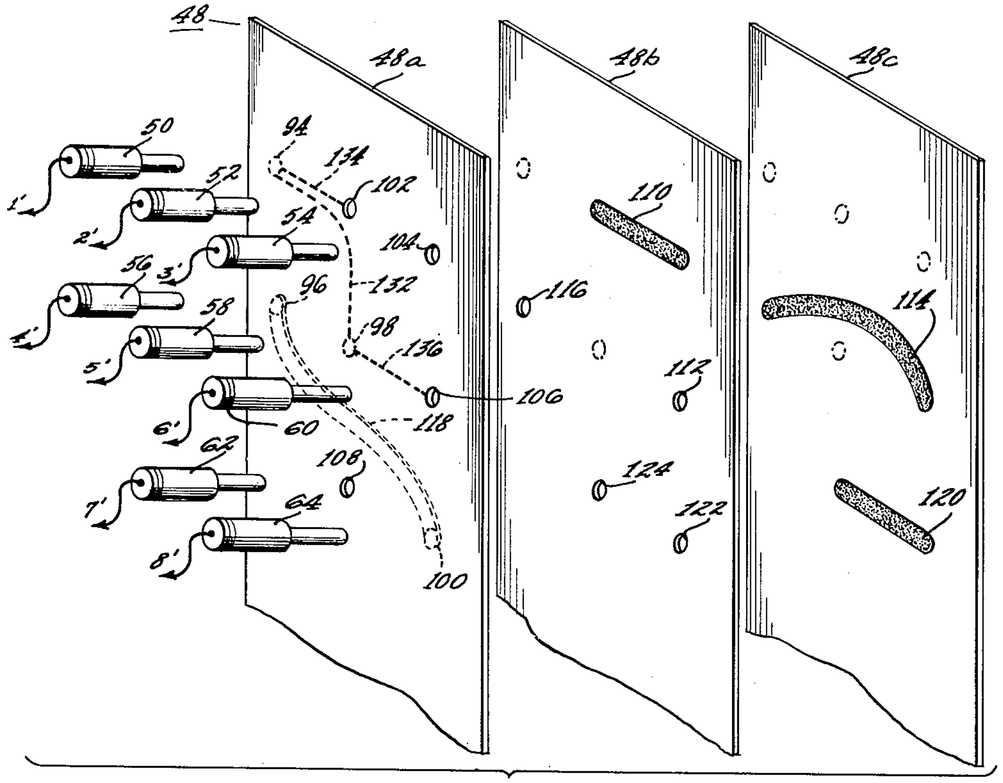
Figure 4 is an exploded elevational view of the laminations comprising one form of card made in accordance with the present invention.

The manner in which the laminated card 48 may be made to determine desirable connections between the frequency change terminals described above is illustrated in Figure 4. In accordance with the present invention, the card 48 may be made up of laminated sheets 48*a*, 48*b*, and 48*c*. Contactors 50 through 64 are illustrated in their relation to the card as it is held by the holder 46. For those terminal connections shown in *"c"* of Figure 1, the card 48 may be made up as illustrated in Figure 4. For purposes of illustrational convenience circular indications shown by dot-dash lines (for example at 94, 96, 98 and 100) represent unbroken surface conditions on both sides of the lamination under consideration whereas the solid lined circles at 102, 104, 106 and 108 on lamination 48*a* illustrate, in perspective, holes extending through and breaking both surfaces of each lamination. The dot-dash designations are presented only as aids in visualizing the operation of the card as described hereinafter.

In further accordance with the present invention, the lamination 48*b* of the card 48 is provided with a conductive path 110 directly under the holes 102 and 104 through which extend the pins of the pressure contactors 52 and 54. Thus, an electrical path will be provided between the contactors 52 and 54 which correspond to frequency change terminals 2′ and 3′ of Figure 1. In order to realize the connection between frequency change terminals 6 and 7 at *"c"* of Figure 1 by means of the card 48 in Figure 3, a novel and devious arrangement is provided. The pin of pressure contactor 60 is allowed to pass through a hole 106 in the lamination 48*a*. A corresponding hole 112 is provided in the lamination 48*b* so as to permit the pin of the contactor 60 to touch the extremity of the conductive path 114 placed on the lamination 48*c*. It is understood that the conductive path 114 is placed only on the unexposed side of the lamination 118. The conductive path bridges contact positions 4′ and 6′ only on the lamination 48*c*. This is seen to be true since the pin of contactor 56 is not permitted to extend through lamination 48*a*.

Thus, the conductive path 114 only bridges the contactor positions but does not make actual contact with the contact pins themselves. In further accordance with the present invention a hole 116 is provided in the lamination 48*b* whereby the conductive path 114 may be permitted to touch another conductive path 118 shown in dotted lines on the unexposed surface of the lamination 48*a*. The conductive path 118 extends and bridges contactor positions 56 and 64 but does not provide actual contact with these contactors, per se. The spring action of the pins on contactors 56 does, however, depress the material of lamination 48*a* sufficiently to produce an electrical contact between the paths 118 and 114 through the hole 116. Correspondingly, the pressure of the spring actuated pin on contactor 64 causes sufficient depression of the material in lamination 48*a* at the position 100 to permit contact of the path 118 with a further conductive path 120 on lamination 48*c*, through the hole 122. This, therefore, provides an electrical circuit path from contactor 60 through circuit 114 through hole 116 to circuit path 118, thence through circuit path 118 through hole 122 to circuit path 120. The only actual connection to any contactor up to this point is a meeting between contactor 60 with circuit path 114 through hole 106 in lamination 48*b*. However, the circuit path 120 extends to the contactor pin position 62 on the unexposed surface of the lamination 48*a*. This permits the pin of the contactor 62 corresponding to frequency terminal 7′ on terminal 44 (Fig. 2*c*) to contact path 120 through holes 108 and 124 respectively positioned in laminations 48*a* and 48*b*. Therefore, a conductive circuit path will be caused to exist between terminal 6 and terminal 7 as well as between terminal 2 and 3 of terminal bank 44 at "*d*" of Figure 1 with the card 48 placed in the holder 46.

It will be seen that the card 48 when removed from the holder 46 will not provide ready means for determining what the connections should be between the terminals of the terminal bank 44 in order to receive a given broadcast. Should one attempt by means of electrical response measuring means to obtain circuit connections between various holes presented in the card 48 the information contained would not be adequate to provide degarbling of incoming signal. For example, continuity testing of the card circuit 48 in Figure 3 would indicate path between contactor 52 and 54. This would be correct. However, a check between the holes in the card corresponding to positions 6 and 7 would disclose an open circuit which, of course, is incorrect degarbling information.

Figure 5:
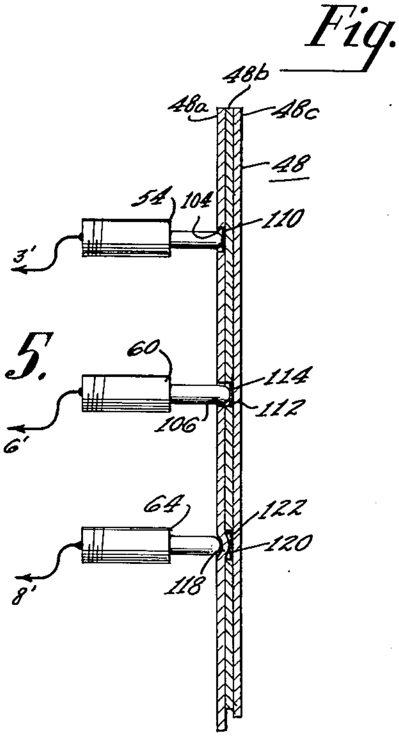
Figure 5 is a magnified sectional view of an assembled laminated card constructed in accordance with the present invention.

To further make clear the method by which pressure connections by the laminations of the card 48 in accordance with the present invention are utilized, a cross sectional view of the card 48 when assembled is shown in Figure 5. Here contactor 54 is shown in contact through hole 104 with the conductive path 110 on lamination 48*b*. Contactor 60 is shown in contact with conductive path 114 by means of the extension of the contactor path through holes 106 and 112. The pressure connection between the unexposed conductive path 118 on the lamination 48*a* is shown accomplished by the pressure action of contactor 64 which causes the conductive path 118 to be pushed through the hole 122 in lamination 48*b* to contact the conductive path 120 on the unexposed surface of lamination 48*c*.

Figure 6:
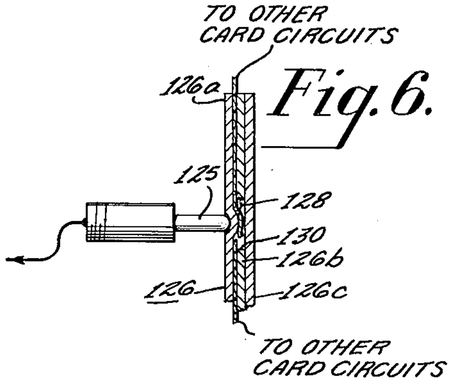
Figure 6 is a magnified sectional view of another form of laminated card constructed in accordance with the present invention.

It will be understood that the pressure action on unbroken areas of the outer lamination surfaces of the laminated control card shown in Figure 4 which affects the completion of otherwise incomplete internal circuit paths, may in accordance with the present invention be inverted so that the pressure of the contactor paths causes interruptions in already existing circuit paths within the card structures. This is shown in Figure 6, where a contactor pin such as 125 causes sufficient depression of the lamination 126*a* of a card 126, that a conductive strip 128 is caused to protrude into a space formed by a hole 130 in the lamination 126*b*. If the conductive strip 128 is made of sufficiently low resilience, it will be caused to break by this pressure action so that any connections within the cards that might be accomplished by the strip 128 will be interrupted. This principle can be directly applied to the card 48 in Figure 3 if, for example, the internal circuit path 132 of the breakable strip were between the pin positions 94 and 98 which are in turn connected by auxiliary hidden circuit paths 134 and 136 to contact positions 50 and 60. Continuity testing of the card, prior to its placing in a holder, would lead one to believe that there existed a desirable connection between contactors 52 and 60 corresponding to frequency terminals 2′ and 6′ respectively. However, upon inserting the card 48 in the holder 116 the circuit path 142 will be broken thereby interrupting this truly fraudulent connection. To avoid illustrational ambiguity the breakable circuit paths 132 and the circuit paths 134 and 136 have been shown as single dotted lines in contradistinction to the method of showing the circuit path 118 described above.

Although the novel card control features embraced by the present invention have been illustrated in relation to radio communication secrecy systems, it will be understood that card records embodying the principles taught herein may find a variety of uses in fields other than radio communication.

What is claimed is:

1. In a data storage device of the card type the combination comprising a plurality of insulating sheets fastened together in card form at least one of said outside sheets having extending through it at least two openings through which electrical contacts may pass; a conductive path on the surface of another sheet immediately adjacent to said last named sheet such that said openings permit access to said conductive path and pressure operated circuit opening means within said laminations connected with said conductive path when connection through said openings are made to said conductive path.

2. In a control card for electrical communication techniques the combination of a plurality of laminations fastened together to form a card, said laminations being of substantially non-conductive material, a first one of said laminations having on the unexposed surface thereof a circuit path connecting at least two positions on said lamination, a second lamination immediately adjacent to said first lamination with openings thereon permitting access to the circuit path on said first lamination through said second lamination and a third lamination separated from said first lamination by said second lamination with circuit paths thereon connecting specific areas on said third lamination, these latter circuit paths having portions in common with said openings in said second lamination to permit contact of said third lamination circuit paths with said first lamination circuit path through said holes in said second lamination upon the application of pressure transverse of said card in and around the area on said first and third laminations corresponding to the openings in said second laminations.

3. A control card for establishing predetermined electrical connections between a plurality of electrical sensing elements when applied to said card, comprising in combination at least one circuit path contained within said card with conductive surface areas on the surface of said card to permit access to the circuit path within said card and pressure operated switching means within said card for determining the electrical continuity of said circuit path conditionally upon the application of predetermined pressure to predetermined areas on said card.

4. A control card for establishing predetermined electrical connections between a plurality of electrical sensing elements when applied to said card, comprising in combination at least one circuit path contained within said card with conductive surface areas on the surface of said card to permit access to the circuit path within said card and pressure operated switching means within said card for determining the electrical continuity of said circuit path conditionally upon the application of predetermined pressure to predetermined areas on said card other than those areas on said card permitting access to said circuit path.

5. In a data storage card of the type employed to control electrical circuit connections external to itself and coupled to said card through a plurality of continuity sensing electrodes applied to said card, the combination of a plurality of circuit paths contained within said card with access areas on the surface of said card permitting the sensing of said circuit paths by said continuity sensing electrodes, at least one pressure operated switching means contained within said card and connected with said card contained circuit paths for altering the continuity of one or more of said paths in accordance with the application of predetermined pressures to said card at discrete areas on said card.

6. A record bearing medium comprising a plurality of insulating laminations fastened together in card form; a first, second, and third of said laminations being immediately adjacent one another, the surfaces of said first and third laminations closest to said second lamination being designated as inner surfaces while the remaining surfaces of said first and third laminations being designated as outer surfaces, a conductive circuit path between two points on the inner surface of said first lamination; at least two separate conductive circuit paths on the inner surface of said third lamination, at least one point on each of said last named circuit paths corresponding respectively to separate positions on the inner surface of said first lamination through which pass said conductive paths, said second lamination having apertures therein permitting pressure contacting of said third lamination conductive paths with said first lamination conductive paths through said second lamination apertures.

7. A storage device for containing electrical signal distribution information comprising: a card member made of substantially non-conductive material having one face thereof provided with contact areas by means of which contact may be made from without with electrical circuitry contained within the card, and pressure responsive switching means within the card and connected to the electrical circuitry therein for altering the circuitry in response to pressure applied to said card.

8. Apparatus according to claim 1 wherein said pressure responsive means are responsive to distortion of the card surface.

9. Apparatus according to claim 2 wherein said card is made up of a plurality of electrically non-conductive sheets two of said sheets having contact areas which cooperate with one another through openings in other sheets separating the two named sheets.

References Cited in the file of this patent

UNITED STATES PATENTS

| | | |
|---|---|---|
| 1,393,822 | Parker | Oct. 18, 1921 |
| 1,776,992 | Brockman | Sept. 30, 1930 |
| 2,512,820 | Bader | June 27, 1950 |